(12) United States Patent
Coley et al.

(10) Patent No.: US 7,814,464 B2
(45) Date of Patent: Oct. 12, 2010

(54) ADDRESS SUPPORT FOR RESOURCES IN COMMON-LANGUAGE RUNTIME LANGUAGES

(75) Inventors: Jerry Coley, Arlington, WA (US); Mark McNulty, Renton, WA (US); Michelle Watkins, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1014 days.

(21) Appl. No.: 10/802,422

(22) Filed: Mar. 17, 2004

(65) Prior Publication Data

US 2005/0210449 A1 Sep. 22, 2005

(51) Int. Cl.
*G06F 9/44* (2006.01)
(52) U.S. Cl. .................. 717/125; 717/120; 717/127
(58) Field of Classification Search .......... 717/101–128
See application file for complete search history.

(56) References Cited

U.S. PATENT DOCUMENTS

| | | | |
|---|---|---|---|
| 2003/0028364 A1 | 2/2003 | Chan et al. | |
| 2003/0079199 A1 | 4/2003 | Barsness et al. | |
| 2004/0015564 A1 | 1/2004 | Williams | |

OTHER PUBLICATIONS

Craig Utley, "A Programmer's Introduction to Visual Basic .NET", May 2001, SAMS Publishing, pp. 1-189.*
Griffiths et al, ".NET Windows forms in a Nutshell—A Desktop Quick Reference", Apr. 2003, O'Reilly, Chapter 3, pp. v-vii, 54-90.*
European Search Report , 051019172-2211, Jun. 12, 2005, 3 pages.
Ye, Y. and Fischer, G. "Information Delivery in Support of Learning Reusable Software Components on Demand," 2002 International Conference on Intelligent User Interface Jan. 2002 pp. 1-8.
Y. Ye et al. "Integrating Active Information Delivery and Reuse Repository Systems," Proc. Of 8th International Symposium on Foundations of Software Engineering. 2000. pp. 66-74.
Mayo, J. "Borland® C#Builder™ for the Microsoft® .NET Framework" Aug. 2003. pp. 1-18.
Theobold, T. "Borland C++ Builder 6 Overview," Jan. 2002. pp. 1-19.
Bischofberger, W. "Sniff—A Pragmatic Approach to a C++ Programming Environment," UBS Information Technology Laboratory. USENIX C++ Conference, Aug. 1992. pp. 1-17.
W. Bischofberger et al. "Object-Oriented Programming Environments: Requirements and Approaches," UBS Information Technology Laboratory, pp. 1-12, 1994.
Dragan, R. and Sarrel, M. "Brave New Apps: The Development Tools," PC Magazine, Aug. 5, 2003. pp. 1-11.
Johnson, R. and Russo, V. "Reusing Object-Oriented Designs," 1991. pp. 1-40.
Second Chinese Official Action for Serial No. 200510059428.4, filed Mar. 17, 2005, 8 pgs. with best available English translation text of Second Official Action.

* cited by examiner

*Primary Examiner*—Ted T Vo
(74) *Attorney, Agent, or Firm*—Westman, Champlin & Kelly, P.A.

(57) ABSTRACT

A computer-implemented method is disclosed for reducing coding errors prior to runtime in the context of a managed code execution environment. The method includes providing a developer with access to a plurality of managed code resources. The method also includes verifying that a resource identifier input by the developer corresponds to one of the plurality of managed code resources.

20 Claims, 5 Drawing Sheets

US 7,814,464 B2

ADDRESS SUPPORT FOR RESOURCES IN COMMON-LANGUAGE RUNTIME LANGUAGES

BACKGROUND OF THE INVENTION

The present invention generally pertains to programming tools provided to a software developer. More particularly, the present invention pertains to programming tools for addressing resources, in particular resources that are compliant with the Common Language Specification.

Programming within a managed code execution environment is known in the art. One known example of such an environment is the environment that includes the Common Language Runtime (CLR). Compilers and tools expose the runtime's functionality and enable a developer to write code that benefits from managed code execution. Code that is developed with a language compiler that targets the runtime is known as managed code. Managed code benefits from features such as cross-language integration, cross-language exception handling, enhanced security, versioning and deployment support, a simplified model for component interaction, and debugging and profiling services.

It is an understood theory that to fully interact with other objects regardless of the language they were implemented in, objects should expose to callers those features that are common to the languages with which they are to inter-operate. With this theory in mind, the Common Language Specification (CLS), which is a set of basic language features common across multiple applications, has been defined. Languages that target the CLR have generally agreed to support CLS features and follow the CLS rules directed to compilers. Compilers for languages that target the CLR have simplified CLS compliance by making CLS data types and features available for creating components. If a component uses only CLS features in the API that it exposes to other code (including derived classes), the component is essentially guaranteed to be accessible from any programming language that supports the CLS. Components that adhere to the CLS rules and use only the features included in the CLS are said to be CLS-compliant components.

Generally speaking, current development environments provide only a cursory-level of support for managing resources, in particular CLS-compliant resources, at design time. In order to insert a resource into code, a developer is commonly required to hard code a reference identifier (e.g., from memory). Alternatively, a developer copies a reference identifier from a reference file (e.g., requiring the developer to switch back and forth between the coding program and the reference file).

A reference identifier for a resource commonly comprises a key name and a string. Given the present level of support for resource management, there is a significant risk that a developer will incorrectly type a key name or string. While the process of consulting a reference file to obtain a key name or string will theoretically reduce errors, the extra effort is tedious and therefore arguably provides some incentive for the developer to guess at the correct values. Of course, the process of guessing is prone to error.

It is common that a bug originating in an inaccurately addressed resource does not produce a build-time error and is typically discoverable at runtime only. This means that while a product is under test, the code-path that actually exercises the incorrectly addressed resource generally must be hit. Recognizing all addressing errors can be difficult without code-invasive measures. Also, for address correction under these testing circumstances, the tester of the application typically is required to correctly interpret an addressing error, which is not always an easy or straightforward task.

SUMMARY OF THE INVENTION

Embodiments of the present invention pertain to a computer-implemented method for reducing coding errors prior to runtime in the context of a managed code execution environment. The method includes providing a developer with access to a plurality of managed code resources. The method also includes verifying that a resource identifier input by the developer corresponds to one of the plurality of managed code resources.

DETAILED DESCRIPTION OF ILLUSTRATIVE EMBODIMENTS

Figure 1:
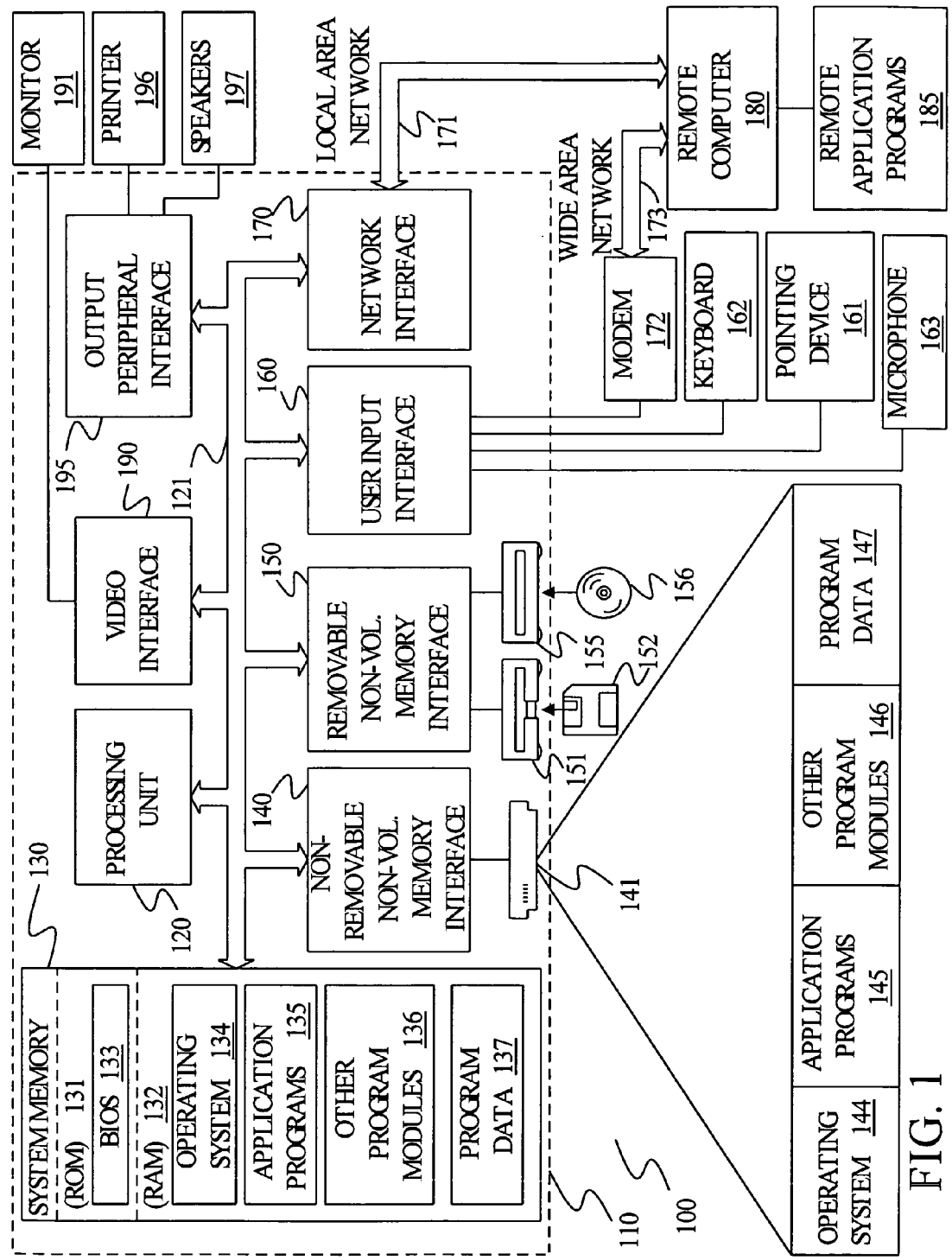
FIG. 1 is a block diagram of one computing environment in which the present invention may be practiced.

FIG. 1 illustrates an example of a suitable computing system environment 100 within which embodiments of the present invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a central processing unit 120, a system memory 130, and a system bus 121 that couples various system components including the system memory to the processing unit 120.

The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
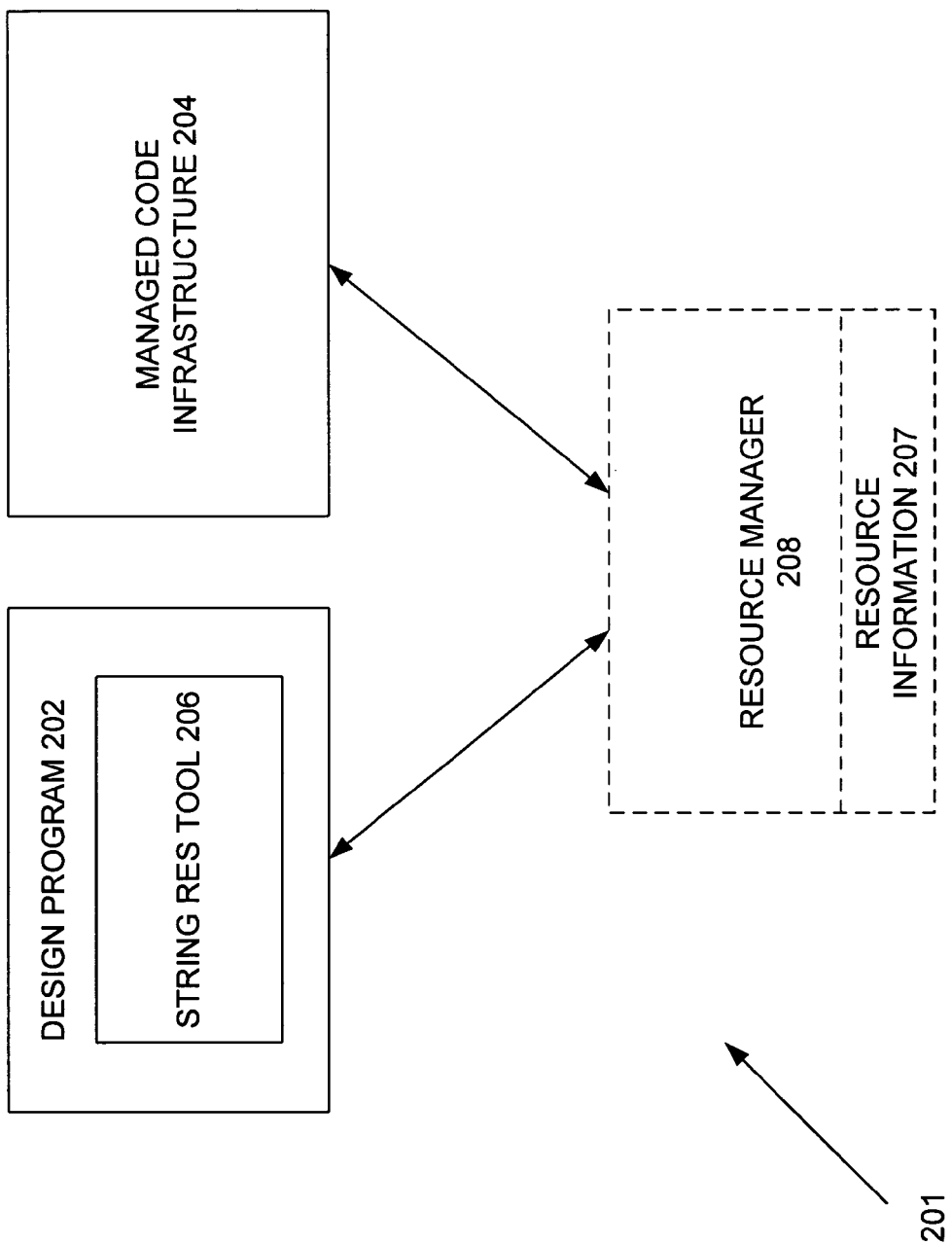
FIG. 2 is a schematic block diagram illustrating a code development environment.

FIG. 2 is a schematic block diagram illustrating a code development environment 201 in accordance with one aspect of the present invention. The environment includes a design program 202 and a managed code infrastructure 204. Infrastructure 204 is illustratively, although not necessarily, a managed code execution environment such as but not limited to an environment that incorporates the existing NET framework offered by Microsoft Corporation of Redmond, Wash.

Design program 202 is a development tool, in particular a programming environment, that operates in conjunction with managed code infrastructure 204 to provide tools for designing, building, testing and deploying applications. Design program 202 is illustratively, although not necessarily, a program in the VISUAL STUDIO NET line of products offered by Microsoft Corporation. Managed code infrastructure 204 illustratively incorporates a managed code execution environment that is configured to support cross-language compliant code. In accordance with one embodiment, infrastructure 204 incorporates the Common Language Runtime component of Microsoft Corporation's .NET infrastructure, wherein, in this case, design program 202 is configured to cooperate with managed code infrastructure 204 in the production of code that is at least partially CLS-compliant.

In accordance with one aspect of the present invention, managed code infrastructure 204 and design program 202 together provide a resource manager 208 that manages resource information 207 for languages supported by managed code infrastructure 204. In accordance with one embodiment, resource information 207 includes information pertaining to CLS-compliant resources. Within FIG. 2, resource manager 208 and information 207 are shown in a dotted box that is disassociated from program 202 and infrastructure 204. This arrangement is intended to reflect the fact that the precise implementation is not critical to the present invention. The resource manager and information could be implemented as part of infrastructure 204, as part of program 202, as separate components or otherwise.

A resource request is communicated to resource manager 208 via any of a variety of known acceptable methods. In accordance with one embodiment, a resource is illustratively requested via a "GetString(string KeyName)" method. For example, during design time, a developer interfaces with program 202 and creates code that incorporates a call to resource manager 208, for example a call for a CLS-compliant component maintained as part of resource information 207. The coded resource call illustratively includes an indication of a string and key name associated with the desired resource. Based on the coded resource call, at some point in the process, a corresponding string resource request is made to resource manager 208 utilizing a "GetString(string KeyName)" call. If the string and/or key name is not entered correctly at design time (e.g., a typo in the KeyName), it is not uncommon that the error is not easily discoverable until runtime. Again, a method other than the described GetString method can be utilized without departing from the scope of the present invention.

In accordance with one aspect of the present invention, design program 202 includes a StringRes tool 206 generally configured to reduce or eliminate errors in the addressing of resources prior to runtime. StringRes tool 206 is illustratively a custom tool that supplements design program 202 in order to help better manage string resources. In accordance with one embodiment, StringRes tool 206 is shipped as an integral part of design program 202. In accordance with another embodiment, StringRes tool 206 is an upgrade that can be integrated or installed into program 202.

Assuming design program 202 includes StringRes tool 206, in accordance with one embodiment, the tool is automatically implemented in association with any coding project initiated by a developer utilizing design program 202. In accordance with another embodiment, however, a developer is provided with the functionality of tool 206 only when the tool is turned on or installed in the context of a specific project (i.e., the tool is selectively activated on a project by project basis).

Figure 3:
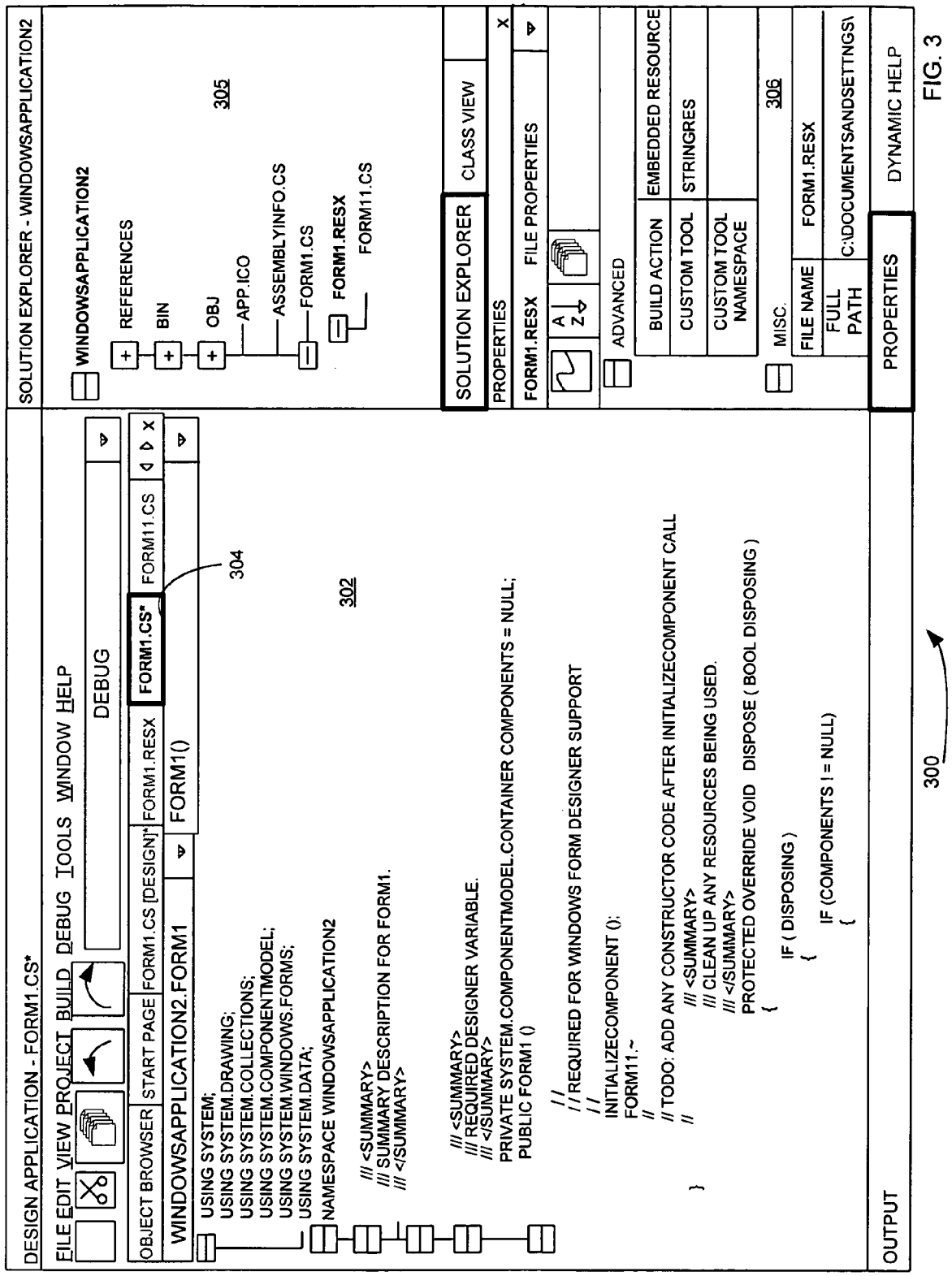
FIG. 3 is an exemplary screenshot.

FIG. 3 is a screenshot 300 that represents one example of what an interface to design program 202 might look like. A developer illustratively inputs code into coding area 302. In the specific context of screenshot 300, as is indicated by highlighted tab 304, a developer is authoring code in conjunction with a file designated as "Form1.cs".

A file selection area 305 is provided to enable the developer to move between different files and different projects. A configuration area 306 is provided to enable the developer to at least selectively activate or deactivate various programming tools such as StringRes tool 206. In the specific context of screenshot 300, as is indicated within area 306, the StringRes tool has been activated in conjunction with the "FORM1.RESX" file. Accordingly, the functionality of the StringRes tool will be provided to the developer when he or she enters code in the context of the FORM1.RESX file. In accordance with one embodiment, the functionality will also be extended to files that bear a predetermined hierarchical relationship to the Form1.resx file. Accordingly, in accordance with one aspect of the present invention, the StringRes tool is implemented as a custom programming tool that is activated on an as-desired basis. For the purpose of the present description, it will be assumed that StringRes tool 206 is also activated for the "FORM1.CS" file, which is the file open in coding area 302.

With this in mind, in accordance with one aspect of the present invention, a subsystem associated with the StringRes tool (e.g., a project management subsystem) is able to respond in accordance with a particular CLR-compliant language in use for a project being worked on. When a new file is added to a project, or an existing file is modified (e.g., by touching the CustomTool properties), that file's parent is inspected. The parent determines if the project is C#, C++, VB, etc. Based on that determination, code is emitted in the appropriate language for the project. In this manner, one design program solution can contain multiple projects, and the StringRes tool can accommodate.

In accordance with one aspect of the present invention, StringRes tool 206 provides a developer with convenient design-time accessibility to resource address/index information and also optionally to the values that correspond to the catalogued resources. In accordance with one embodiment, the access to resources is provided in the form of information displayed in pop-up windows and/or drop-down lists (e.g., directly within the design program interface) that assist the developer in statement and function completion. For example, identifier information (i.e., key name, string and/or value information) that corresponds to available resources are displayed to the developer for selection and statement completion.

In accordance with one embodiment, valid resource information is displayed for a specific resource reference. For example, following entry of a resource object, command or function, an activator key initiates a display of a drop-down list of valid values for the current command or function. In accordance with one embodiment, the activator key is a period (.). In accordance with other embodiments, the activator key is a space bar, the left (open) parenthesis, or some other key call. In accordance with one embodiment, navigating (i.e., scrolling) or typing through a drop down list and stopping (e.g., for a predetermined amount of time) on one of the available selections will cause additional information to appear in a pop-up window proximate to the drop-down menu.

In accordance with one embodiment, a developer is provided with options on the design program interface that enable him or her to adjust the status of the automatic delivery of resource information to Auto, Manual or Disabled. When set to Automatic, a resource list automatically appears when an activator key is pressed. When set to Manual, the developer can selectively activate display of resource information (e.g., with an Edit menu command, a shortcut menu selection, or a CTRL key combination) when a cursor is positioned at a location associated with information availability.

In accordance with one embodiment, information specifically related to CLS-compliant resources is made available to a developer through the described design program interface upgrades offered as a component of StringRes tool 206.

Generally speaking, StringRes tool 206 enables efficient cross-referencing for the selection of resource identifiers and corresponding information, in particular identifiers and information related to CLS-compliant resources. Accordingly, in accordance with one aspect of the present invention, when a developer enters a resource class and follows it with an activation key, a list (e.g., a drop-down menu) is automatically provided showing the related accessible methods and properties. In accordance with one embodiment, the automatically generated list is a collection of key names for available strings. In accordance with another embodiment, highlighting one of the key names then initiates provision of the related string value (e.g., within a pop-up box).

Figure 4:
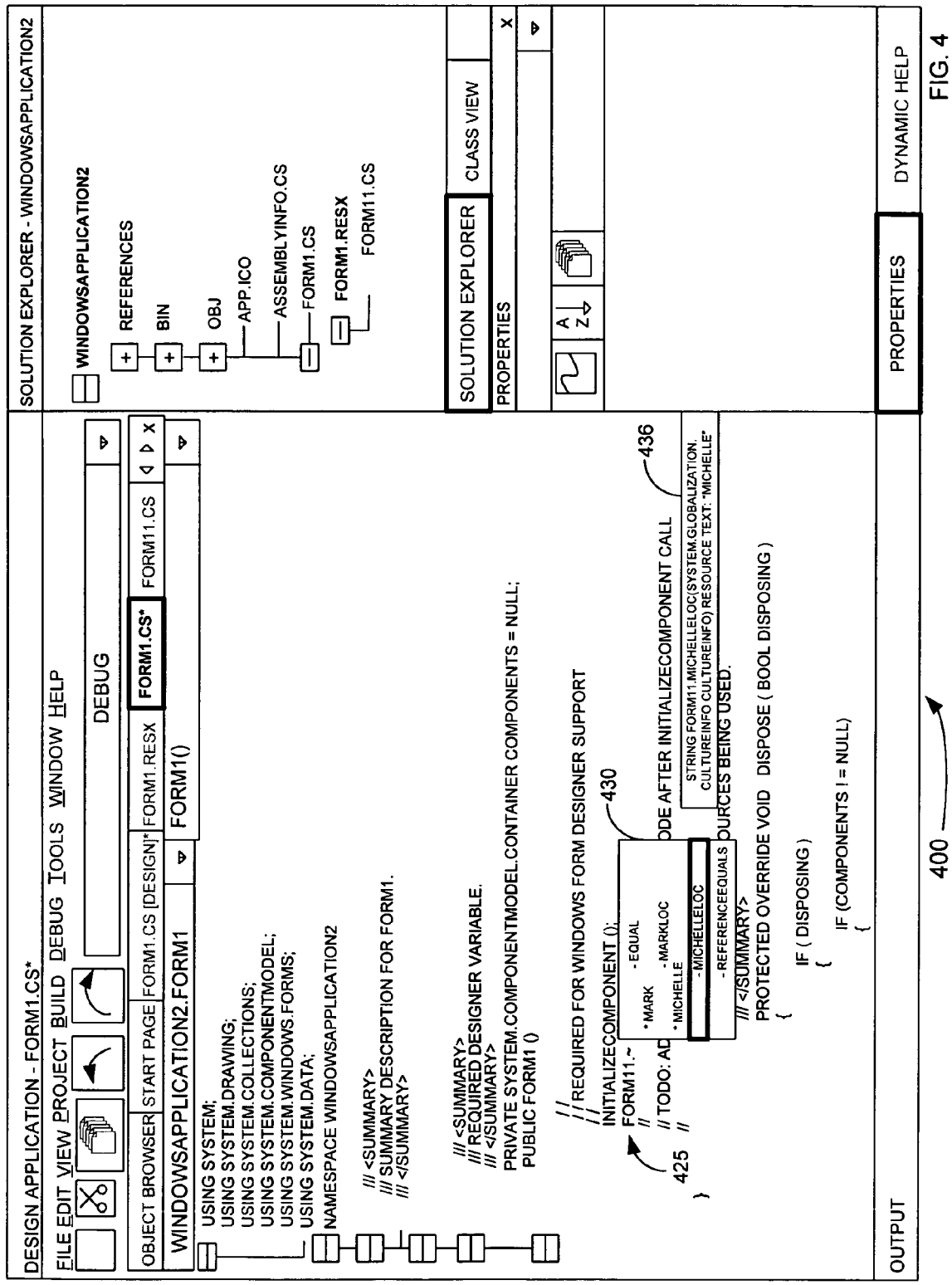
FIG. 4 is an exemplary screenshot.

FIG. 4 is a screenshot 400 that represents another example of an interface to design program 202. The FIG. 4 shot is substantially similar to the FIG. 3 shot, and the assumption that StringRes tool 206 is activated remains valid. Within the coding area at location 425, a developer has keyed in "FORM11", which is illustratively a precursor to input of a resource identifier. Following the precursor, the developer has keyed in a period (.), which is illustratively an activator key that initiates a response from StringRes tool 206 in the form of a drop-down menu 430. Menu 430 illustratively contains resource information that is valid for the corresponding precursor entry.

In accordance with one embodiment, the information in the drop-down box is arranged in a hierarchical fashion. For example, a resource can illustratively be available based in a plurality of languages, each corresponding to a separate element displayed in the box as a hierarchical element related to a broader source element. Of course, organization can be based on any factor other than language. It should be noted that menu 430 can be configured to contain more than the illustrated six choices (e.g., a scrollable list alphabetically or otherwise arranged). The elements listed in menu 430 can be, but are not necessarily, key names that correspond to elements such as CLS-compliant elements.

To continue the example, the developer then navigates through menu 430 and stops on the "MICHELLELOC" entry. Pausing on the entry illustratively initiates appearance of a corresponding a pop-up box 436, which contains string and/or value information related to the element selected from menu 430. Ultimately, the developer will select one of the entries from menu 430. Selection will cause a resource key name, string and/or value to be automatically inserted into the code at an appropriate location.

Figure 5:
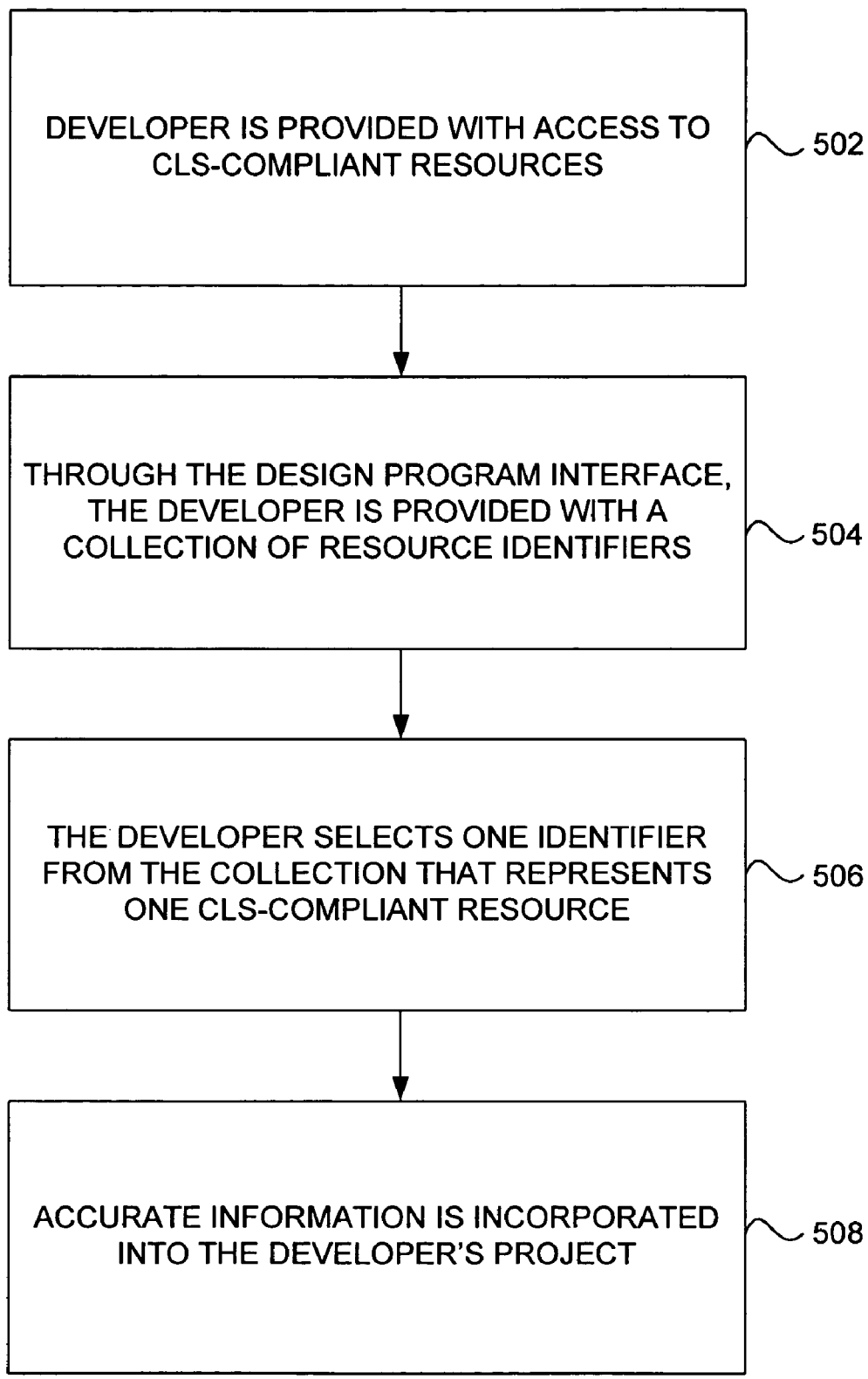
FIG. 5 is a flow chart illustrating steps associated with directly accessing information pertaining to CLS-compliant resources.

FIG. 5 is a flow chart illustrating steps associated with one embodiment of the present invention. In accordance with block 502, a developer is provided with access to CLS-compliant resources. In accordance with step 504, during code development, the developer is presented with a collection of resource identifiers that each represent a CLS-compliant resource. As is indicated by step 506, the developer then selects from the collection an identifier that represents a desired CLS-compliant resource. Finally, in accordance with step 508, corresponding and accurate information is incorporated into the developer's project.

In accordance with another aspect of the present invention, StringRes tool 206 provides support for a build-time check to determine whether resources, in particular CLS-compliant resources, have been addressed in error. The check is carried out by comparing resource identifier values in the code with a collection of valid values (e.g., the same collection of resource values that are maintained in order to support the described design-time provision of resource information). If there is a resource value that does not match a stored value, an error will illustratively be submitted to the developer for correction. In accordance with one embodiment, the system is configured to enable a developer to add information to the list of valid values as necessary to configure the system to accept new or different resource inputs.

In accordance with one embodiment, with reference to the FIG. 3 screenshot, to extend the resource tools to new resource information, a developer selects (e.g., right clicks) a project within the area 305 solution explorer. The developer can then initiate an addition to the project file of a file with an extension of ".strings". New strings are then added to the .strings file as necessary.

In accordance with one more specific embodiment, to add new resource information, a developer first brings up a menu of functional options by choosing (i.e., right-clicking) a project in solution area 305. The developer then selects an "Add New Item" function in order to bring up a dialog. The developer then chooses a "Resources" category and a "String Resource Tool sub-category in order to add to the project a file with an extension of ".strings". Selecting a "Show All Files" option in the solution explorer will illustratively reveal that the .strings file has two children items, a ".cs" file and a ".resx" file. The children files are illustratively not to be edited directly as they are generated from the .strings file. These files are generated not at build time but instead are generated whenever there is a change to the .strings file, or to the custom tool or custom tool namespace properties of the .strings file.

To add resource information, the developer simply adds information to the .strings file, for example, using the format "<keyName>=<value>". One example of the format is:

SimpleMsg=This is a simple message.

The default file name of the .strings file is illustratively STR1.strings, which generates a class named "STR1" in the child ".cs" file (the class names comes from the file name). Accordingly, for example, within a C# programming environment, the following would be an accurate example:

STR1.SimpleMsg; // the string returned from this would be "This is a simple message."

The common operation of using string.format is illustratively taken care of by the tool also. An example is:

FileNotFoundError(filename, description, int retries)=The file {0} was not found because {1}. The number of retry attempts was {2}.

Not specifying the type of a given parameter illustratively defaults to System.String for the type. Within the c# programming environment, an applicable example is:

STR1.FileNotFoundError("myFile.abc", "the file was deleted", 30); //This would print: The file myFileabc. was not found because the file was deleted. The number of retry attempts was 30.

Comments in the .strings file illustratively begin with either a pound sign (#) or a semicolon (;). Comments marked with the pound sign are illustratively not seen externally, whereas those marked by a semicolon are generally available. The comments to be seen externally are output to the .resx file. The StringRes tool illustratively only recognizes valid comment lines if and only if the first character in the line is either '#' or ';'.

Each message in the .strings file illustratively generates two accessors in the auto-generated class. One is for "language neutral" and one is for a "specified language". For messages of the simple type, the accessor is a field. To add a language as a parameter a function is added and the name is changed slightly (e.g., "Loc" is appended to the field name). For messages that take parameters, the name is unchanged; and only the parameter list changes (i.e., a CultureInfo parameter is added). A casual perusal of the auto-generated .cs file will reveal the details.

The .strings file when added to a project illustratively has the custom tool property set to "StringRes," the Custom Tool Namespace set to null, and the Build Action set to "none." The namespace for the output of StringRes is obtained from the project, but it can illustratively be overridden by setting the Custom Tool Namespace to the desired namespace for the output.

The way a design program recognizes the StringRes tool as the Custom Tool is illustratively by the file in the solution explorer having the Custom Tool property set to StringRes. Accordingly, adding a .txt or .abc file is fine (i.e., within a c# project) as long as the CustomTool property is set to StringRes and the file is in the valid format.

After deployment of culture-neutral resources in production, loc resources can illustratively be deployed at any time without touching binaries; and without requiring a rebuild. If a string resource is requested and is unavailable at runtime, the hierarchy of resources is illustratively traversed and the root of the hierarchy is the culture-neutral resource set. So, if a Japanese string is requested, but unavailable, then the English string will be returned. If later the Japanese resource set becomes available, the Japanese string will be returned instead.

As an example, consider the following scenario:
1) AppX uses string resources embedded in the AppX executable;
2) six weeks later, a sudden interest in AppX arises in Austria, the language of Austrian German being "de-At" in the System.Localization.CultureInfo class;
3) In AppX's executable directory, a subdirectory of "de-AT" is created as well as one of "de" for standard German;
4) The loc vendor for Austrian German is late, but the localized resources are received in time in standard German;
5) The localized resources are dropped in the "de" subdirectory, wherein AppX is still running as the loc resources were dropped hot (e.g., did not have to restart the service);
6) Requests for "de-AT" strings are returned with "de" strings; and
7) At a later date, when the resources for "de-AT" are dropped, they are returned instead.

In accordance with one embodiment, the StringRes tool is configured to manage a plurality of strings, a representation of which are provided in some form to a user (e.g., within a drop-down listbox). The tool provides an auto-complete functionality, wherein when the user selects one of the entries that the StringRes is managing (e.g., selects from the drop-down box), the value of that string is provided to the user in some form (e.g., within a pop-up box).

For example, consider a scenario wherein the StringRes tool is managing STR1.strings that includes "myString=This is my string". If, within the design program interface, the user types in STR1 in an appropriate location (e.g., as the Visual-Studio .net IDE), then a list of corresponding options will be presented (e.g., within a drop-down list box). If the user selects from the list of options myString then the tool will report the corresponding value (e.g., "This is my string"). In accordance with one embodiment, the value is reported within a balloon or a pop-up box). Accordingly, the user is able to obtain the value of the addressed string at design time.

The methods described herein generally reduce or eliminate resource-addressing errors, thereby preventing the errors from being introduced into an application. Providing the value of resources, in particular CLS-compliant resources, at design time enhances the productivity and accuracy of code development.

The present description includes an explanation as to how strings are added specifically to a .strings file. In accordance with one aspect of the present invention, the StringRes tool also works with standard files (e.g., standard .resx files). In accordance with one embodiment, when string definitions are added to the definitions made available through the StringRes tool functionality, all that is required is a name/value pair (e.g., "myString=This is my string").

Although the present invention has been described with reference to particular embodiments, workers skilled in the art will recognize that changes may be made in form and detail without departing from the spirit and scope of the invention.

What is claimed is:

1. A computer-implemented method for reducing coding errors prior to runtime in the context of a managed code execution environment, comprising:
providing a developer with access to a plurality of managed code resources through a graphical user interface, the graphical user interface having a coding area, a tab, a file selection area, and a configuration area, the coding area receiving code input from the developer, the tab indicating a designation of a file that the developer is authoring, the file selection area enabling the developer to move between different files and projects, the configuration area enabling the developer to selectively activate or deactivate various programming tools, one of the various programming tools being a StringRes tool;
utilizing a computer processor that is a component of the computer to verify that a resource identifier input by the developer corresponds to one of the plurality of managed code resources by:
receiving from the developer a precursor to the resource identifier in the coding area;
following the receipt of the precursor, receiving entry of an activation key from the developer in the coding area;
initiating, based at least in part on receipt of entry of the activation key and the precursor, a response from the StringRes tool, the response including a drop-down menu that is located proximate the precursor in the coding area, the drop-down menu containing resource information that is valid for the precursor, the information arranged in a hierarchical fashion, the information including key names that correspond to elements;
the developer navigating the drop-down menu and pausing on one of the key names;

initiating, based at least in part on the pause, an appearance of a corresponding pop-up box, the pop-up box located proximate the drop-down menu in the coding area, the drop-down menu being located between the precursor and the pop-up box, the drop-down menu including string and value information related to one of the key names;

receiving a selection from the developer of a second one of the key names; and automatically inserting, based at least in part on the selection, the one of the plurality of managed code resources into a programming code, the one of the plurality of manage code resources corresponding to the second one of the key names, the programming code located in the coding area.

2. The method of claim 1, further comprising:

receiving from the developer an addition to the plurality of managed code resources, wherein the addition configures the managed code execution environment to accept a new resource input, wherein receiving the addition comprises:

bringing up a menu of functional options by choosing a project in the file selection area;

selecting an add new item function from the menu;

bringing up a dialog box in response to the add new item function selection;

choosing a resource category and a sub-category to add a file to the project;

adding information to the file, the information having the format "<keyName>=<value>"; and utilizing the file to generate a class in a child file of the file.

3. The method of claim 2, wherein the activation key is selected from the group consisting of a period, a space bar, and a left parenthesis.

4. The method of claim 1, wherein receiving the precursor to the resource identifier further comprises receiving a programming code call.

5. The method of claim 1, wherein the activation key is a period.

6. The method of claim 1, wherein the activation key is a space bar.

7. The method of claim 1, wherein the activation key is a left parenthesis.

8. The method of claim 1, wherein initiating a response from the StringRes tool comprises making a string resource request to a resource manager.

9. The method of claim 1, wherein initiating a response from the StringRes tool comprises making a string resource request to a resource manager utilizing a "GetString (string KeyName)" call.

10. The method of claim 1, wherein providing the developer with access to the plurality of managed code resources comprises providing the developer with the access during design time.

11. The method of claim 1, wherein the configuration area enables the developer to set the StringRes tool to support either an automatically or manually triggered response.

12. The method of claim 1, wherein the configuration area enables the developer to disable the StringRes tool.

13. The method of claim 1, further comprising performing a build-time check on the programming code.

14. The method of claim 13, wherein the build-time check comprises determining whether the one of the plurality of managed code resources has been addressed in error.

15. The method of claim 13, wherein the build-time check comprises comparing the one of the plurality of managed code resources to a collection of valid values.

16. The method of claim 13, further comprising identifying a resource error in the programming code.

17. The method of claim 16, further comprising presenting the resource error to the developer for correction.

18. The system of claim 17, wherein presenting the resource error to the developer comprises presenting the resource error to the developer through the graphical user interface.

19. The system of claim 18, wherein receiving the precursor to the resource identifier further comprises receiving a programming code call.

20. The system of claim 13, wherein providing the developer with access to the plurality of managed code resources comprises providing the developer with the access during design time.

* * * * *

UNITED STATES PATENT AND TRADEMARK OFFICE
CERTIFICATE OF CORRECTION

PATENT NO. : 7,814,464 B2
APPLICATION NO. : 10/802422
DATED : October 12, 2010
INVENTOR(S) : Jerry Mun Coley et al.

Page 1 of 1

It is certified that error appears in the above-identified patent and that said Letters Patent is hereby corrected as shown below:

In column 11, line 6, in Claim 1, after "to" insert -- the --.

In column 12, line 31, in Claim 18, delete "system" and insert -- method --, therefor.

In column 12, line 35, in Claim 19, delete "system" and insert -- method --, therefor.

In column 12, line 38, in Claim 20, delete "system" and insert -- method --, therefor.

Signed and Sealed this
Tenth Day of May, 2011

David J. Kappos
*Director of the United States Patent and Trademark Office*